United States Patent [19]

Manaka et al.

[11] Patent Number: 4,469,064

[45] Date of Patent: Sep. 4, 1984

[54] APPARATUS FOR CONTROLLING INTERNAL COMBUSTION ENGINE

[75] Inventors: Toshio Manaka; Takeshi Atago, both of Katsuta, Japan

[73] Assignee: Hitachi, Ltd., Tokyo, Japan

[21] Appl. No.: 416,044

[22] Filed: Sep. 8, 1982

[30] Foreign Application Priority Data

Sep. 9, 1981 [JP] Japan .............................. 56-141018

[51] Int. Cl.³ ............................................. F02D 11/10
[52] U.S. Cl. ................................................... 123/339
[58] Field of Search .............................. 123/492, 339

[56] References Cited

U.S. PATENT DOCUMENTS

4,191,137  3/1980  Williams et al. ................... 123/492
4,364,349 12/1982  Miyagi et al. ...................... 123/339

Primary Examiner—Ronald B. Cox
Attorney, Agent, or Firm—Antonelli, Terry & Wands

[57] ABSTRACT

In an apparatus for controlling an internal combustion engine in which the quantity of air supplied to the engine is controlled to control the warming-up rotational speed of the engine, a first desired warming-up rotational speed characteritic relative to the temperature of engine cooling water and a second desired warming-up rotational speed characteristic lower in rotational speed level than the former are stored in an ROM of a microcomputer, so that, when the throttle valve is not opened during warming-up of the engine, the actual rotational speed of the engine coincides with the first desired warming-up rotational speed, while, when the throttle valve is opened during warming-up, the actual rotational speed of the engine coincides with the second desired warming-up rotational speed.

12 Claims, 16 Drawing Figures

APPARATUS FOR CONTROLLING INTERNAL COMBUSTION ENGINE

This invention relates to an apparatus for electronically controlling the quantity of air and the quantity and quality of the air-fuel mixture supplied to an internal combustion engine.

U.S. Pat. No. 3,964,457 proposes a technique for controlling an internal combustion engine, in which, in order to rotate the internal combustion engine at an appropriate rotational speed during a warming-up operation, the actual rotational speed (rpm) of the engine is compared with the rotational speed (rpm) corresponding to the temperature of engine cooling water to find the error therebetween, and the quantity of air supplied to the engine is regulated on the basis of the error.

Generally, the desired warming-up rotational speed of the engine is set at a high level so as to shorten the length of time required for warming up the engine with a characteristic of the rotational speed being that the higher the temperature of engine cooling water, the lower the speed becomes along a predetermined gradient.

However, a situation has been frequently encountered that the engine continues to rotate at a high rotational speed for a time when, in the course of warming up, in which the warming-up rotational speed of the engine is controlled to meet the desired rotational speed having such a characteristic, the throttle valve is opened (when, for example, the vehicle is driven under warming-up condition or the throttle valve is merely opened for the purpose of revving up the engine, and is then closed without driving a vehicle. Such a situation occurs for the reason that the depression of the accelerator pedal for opening the throttle valve increases the rotational speed of the engine, but, since the desired rotational speed itself is also high at this time, an air flow control valve actuated according to the control gain based on the error between the two rotation speeds operates with a slow response.

On the other hand, a situation has also been encountered that, while the quantity of fuel is increased for acceleration of the engine when the throttle valve is opened during the warming-up operation, the quantity of fuel is also increased for acceleration even when the vehicle is not driven and the engine is being merely warmed up, resulting in an undesirable increase in the CO component in the engine exhaust gases.

It is an object of the present invention to provide an apparatus for controlling an internal combustion engine in which means are provided for decreasing the warming-up rotational speed as quick as possible when the throttle valve is closed after it is opened in the warming-up stage.

Another object of the present invention is to provide an apparatus of the kind above described in which means are provided to suppress a generation of the CO component to a minimum when the throttle valve is opened under the condition in which the vehicle is not driven and the engine is merely being warmed up.

The control apparatus according to the present invention is featured by the fact that a first desired warming-up speed corresponding to the temperature of engine cooling water and a second desired warming-up rotational speed lower than the first desired warming-up rotational speed are previously set, and the rotational speed of the internal combustion engine is so controlled that the engine rotates at the first desired warming-up rotational speed when the throttle valve is not opened even a single time during warming-up and at the second desired warming-up rotational speed when the throttle valve is opened once and is then closed during warming-up.

The present invention is also featured by the fact that the quantity of fuel is increased for acceleration when the throttle valve is opened during warming-up to drive the vehicle, but the increase in the quantity of fuel for acceleration is not effected when the vehicle is not driven although the throttle valve is opened.

The present invention will be apparent from the following detailed description taken in conjunction with the accompanying drawings, in which.

The present invention will now be described in detail with reference to the drawings.

Figure 1:
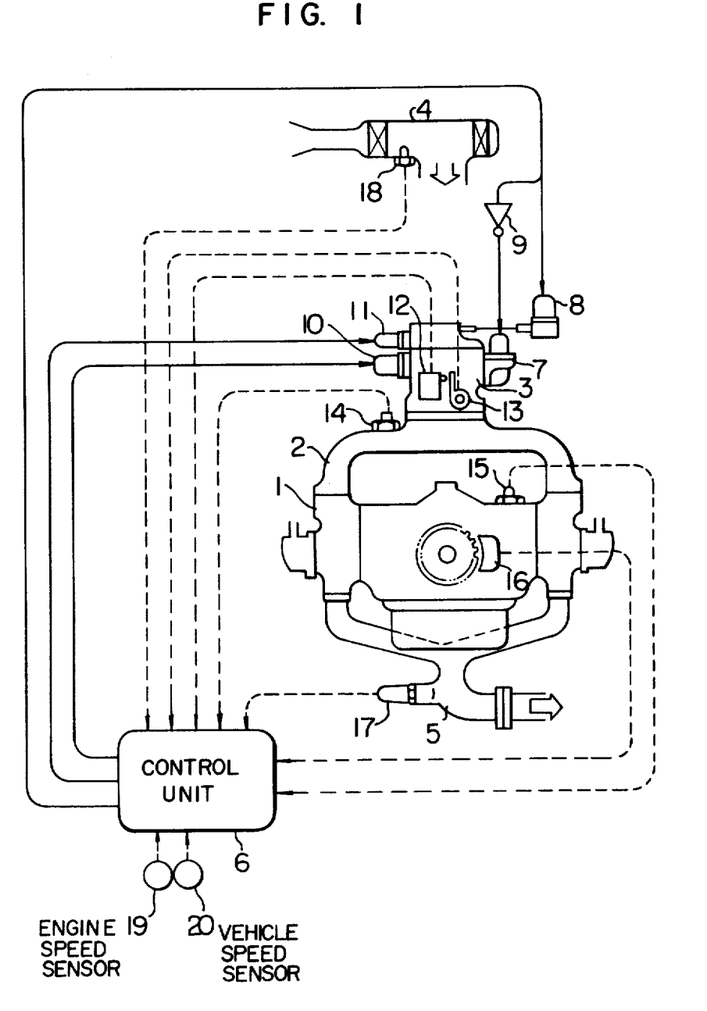
FIG. 1 is a schematic view showing generally the structure of an embodiment of the electronic engine control apparatus according to the present invention.

Referring to FIG. 1, a carburetor 3 is provided in an intake pipe 2 of an internal combustion engine 1. A main fuel control solenoid 7 and a slow fuel control solenoid 8 are associated with the carburetor 3. The main fuel control solenoid 7 is energized for controlling the main jet, and the slow fuel control solenoid 8 is energized for controlling the slow air bleed. Two other solenoids 10 and 11 are also associated with the carburetor 3, with the former solenoid 10 being energized for increasing the quantity of fuel for starting the engine, and the solenoid 11 being energized for increasing the quantity of fuel for accelerating the engine. Further, a throttle switch 12 and a throttle opening sensor 13 are associated with a throttle valve (not shown) disposed in the carburetor 3. The throttle switch 12 senses whether the throttle valve is fully closed or not, and the throttle opening sensor 13 senses the opening of the throttle valve.

An air cleaner 4 is disposed upstream of the carburetor 3 to supply clean air to the carburetor 3. The air cleaner 4 is provided with an intake air temperature sensor 18 sensing the temperature of intake air.

A pressure sensor 14, for sensing the internal pressure of the intake pipe 2, is provided on the intake pipe 2. An exhaust pipe 5 extends from the engine 1, and an $O_2$ sensor 17, for sensing oxygen in the engine exhaust gases thereby detecting the air-fuel ratio, is provided on the exhaust pipe 5. Further, the engine 1 is provided with a crank angle sensor 16 for sensing the engine crank angle, a water temperature sensor 15 for sensing the temperature of engine cooling water, a rotation speed sensor 19 for sensing the rotation speed of the engine 1, and a vehicle speed sensor 20 for sensing the speed of the vehicle.

The output signals from all of these sensors 12 to 20 are applied to a control unit 6 including a microcomputer therein, and, on the basis of the input signals from the sensors, the control unit 6 energizes the actuators such as the main fuel control solenoid 7, slow fuel control solenoid 8, starting fuel increasing solenoid 10 and accelerating fuel increasing solenoid 11 associated with the carburetor 3 thereby controlling the engine 1. The slow fuel control solenoid 8 for controlling air passing through the slow air bleed is connected directly to the control unit 6, but the main fuel control solenoid 7 is connected through an inverter 9 to the control unit 6 so that the operation of the slow fuel increase solenoid 8 is inverse to that of the main fuel control solenoid 7.

Figure 2:
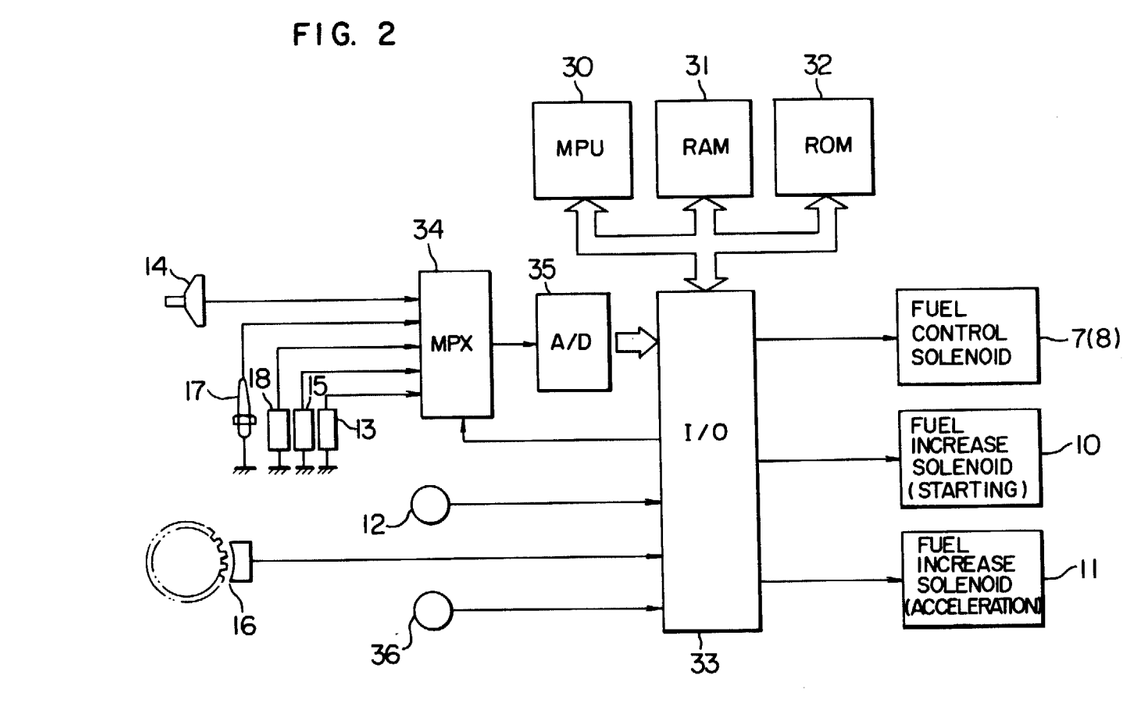
FIG. 2 is a block diagram of the control unit shown in FIG. 1.

As shown in FIG. 2, control unit 6 includes, as its fundamental elements, a microprocessing unit 30 (abbreviated hereinafter as an MPU) for carrying out arithmetic and logic processes, a memory element 32 (abbreviated hereinafter as an ROM) for storing a control program and fixed data, a readable and writable memory element 31, (abbreviated hereinafter as an RAM), and a control part 33 including an input/output interface. The MPU 30, ROM 32, RAM 31 and control part 33 are connected to each other by an address bus, a data bus and control lines. Signals applied to the control unit 6 are classified into analog signals and digital signals.

Analog input signals include the output signals from the intake air temperature sensor 18, cooling water temperature sensor 15, throttle opening sensor 13, $O_2$ sensor 17 and pressure sensor 14. These signals are applied to a multiplexer 34 (abbreviated hereinafter as an MPX). The MPX 34 has the function of selectively applying the analog signals to an analog-digital converter 35 (abbreviated hereinafter as an A/D converter) under control of a control signal applied from the control part 33 under command of the MPU 30. As a result, the A/D converter 35 is actuated to convert its analog input signal into a digital signal which is applied to the control part 33 of the control unit 6.

Digital input signals include the output signal from the throttle switch 12 sensing the full closure of the throttle valve and the output signal from the starter 36. These digital input signals are applied to the control part 33 of the control unit 6.

The crank angle sensor 16 generates two kinds of pulse signals, that is, a pulse signal generated each time the crankshaft rotates through a predetermined crank angle of, for example, 180° and a pulse signal generated each time the crankshaft rotates through another predetermined rotation angle of, for example, 1°. These two kinds of pulse signals are applied to the control part 33 of the control unit 6 as digital data indicative of the rotational speed (rpm) of the engine 1.

On the basis of the input information above described, the MPU 30 makes necessary computation according to the control program stored in the ROM 32, and the resultant data are applied to the control part 33, so that the control unit 6 applies necessary output signals to the elements including the main fuel control solenoid 7, slow fuel control solenoid 8, starting fuel increasing solenoid 10 and/or accelerating fuel increasing solenoid 11 for selectively energizing the same.

Figure 3:
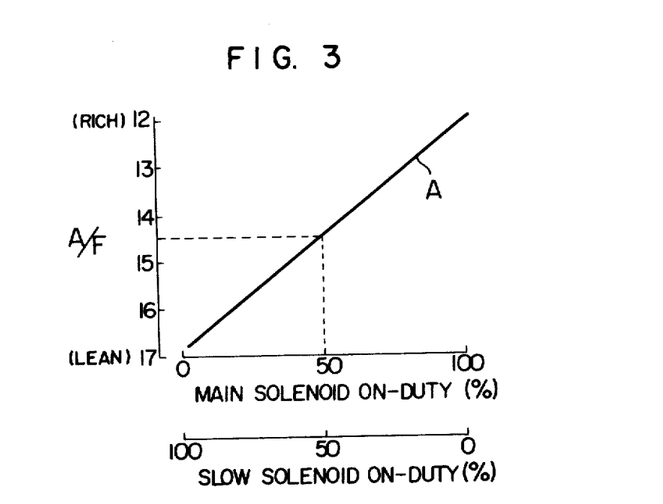
FIG. 3 is a graphical illustration of the air-fuel ratio relative to the on duty factors of the slow and main fuel control solenoids.

The system including the main fuel control solenoid 7 controls the fuel, and, therefore, the air-fuel ratio decreases with the increase in the on-duty factor. On the other hand, the system including the slow fuel control solenoid 8 controls the air bleed, and, therefore, the air-fuel ratio increases with the increases in on-duty factor. Thus, as shown in FIG. 3, the fuel-air ratio can be controlled to be set at the stoichiometric value of 14.7 when the on-duty factors are controlled to be 50%.

Figure 4:
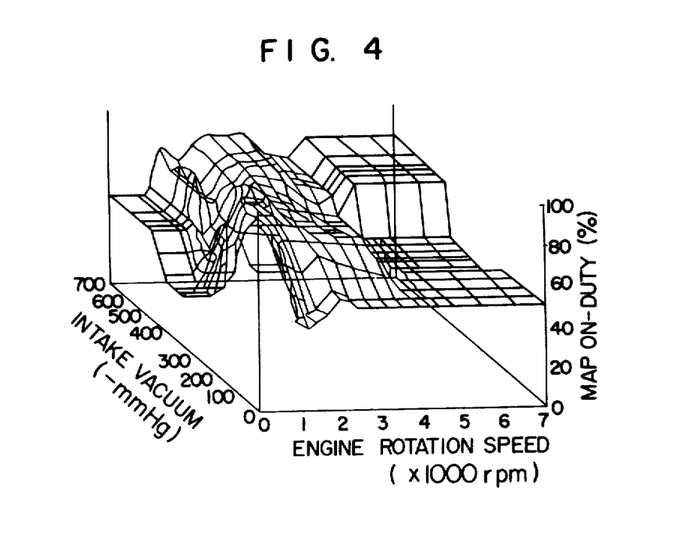
FIG. 4 illustrates a map on the on-duty factors of the slow and main fuel control solenoids.

The air-fuel ratio can be controlled to be set at the stoichiometric value by controlling the main and slow fuel control valves when the operating parameters are fixed. FIG. 4 shows a map representing the on-duty factor relative to various values of the operating parameters including the vacuum in the intake pipe 2 and the rotational speed of the engine 1. Such a control map is stored in the ROM 32. Thus, the on-duty factor required for supplying the air-fuel mixture of the stoichiometric air-fuel ratio can be determined on the basis of the sensed engine rotational speed and intake vacuum.

Figure 5:
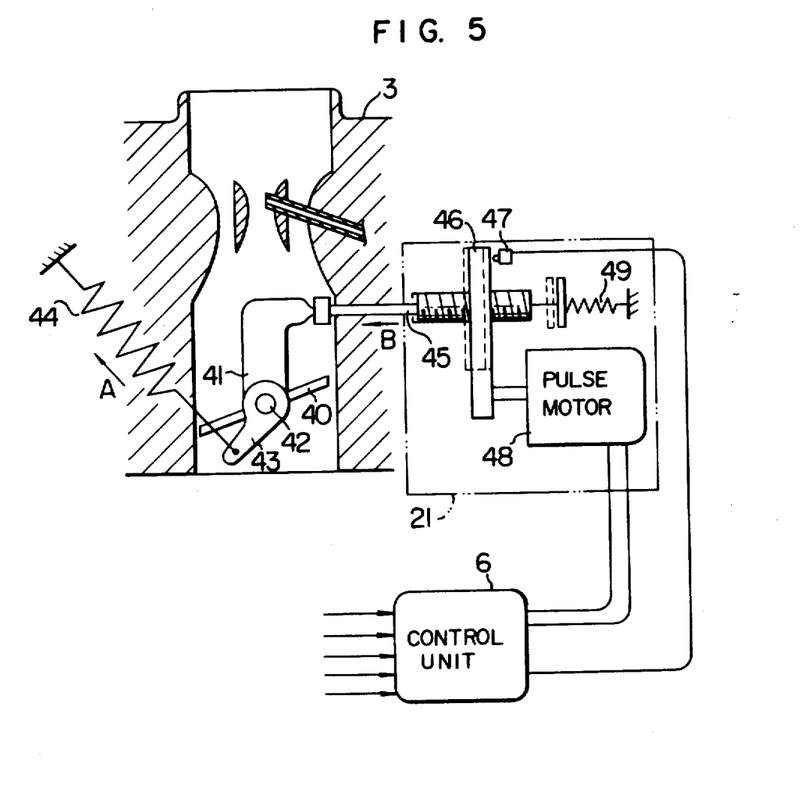
FIG. 5 is a partial schematic cross-sectional detail view of the structure of the throttle actuator employed in the present invention.

Referring to FIG. 5, the throttle valve 40 is disposed downstream of the venturi of the carburetor 3. Associated with this throttle valve 40 are a throttle actuating lever 41 arranged for interlocking movement with the throttle valve 40 and a throttle return lever 43 pivoted to the throttle valve 40 by a pivot pin 42 for making rocking movement around the pivot pin 42. A return spring 44 is anchored at one end thereof to one or free end of the throttle return lever 43 so as to normally bias the throttle return lever 43 in one direction. The free end of the throttle actuating lever 41 is engaged by one end of a stroke shaft 45 which makes threaded engagement at its threaded portion with a reduction gear 46 mounted on the shaft of a pulse motor 48. An idling sensing switch 47 is disposed adjacent to the reduction gear 46 so that idling is sensed when the reduction gear 46 is brought into contact with the idling sensing switch 47. A spring 49 is anchored at one end thereof to the other end of the stroke shaft 45, that is, the end remote from the end making engagement with the throttle actuating lever 41, so as to normally bias the stroke shaft 45 in a direction shown by the arrow B. The pulse motor 48, spring 49, idling sensing switch 47, stroke shaft 45 and reduction gear 46 constitute the throttle actuator 21.

The throttle valve 40 is normally biased clockwise, as viewed in FIG. 5, by the force of the return spring 44 in the direction of the arrow A. Unless the accelerator pedal is depressed, the throttle actuating lever 41 presses against the stroke shaft 45, and the idling sensing switch 47 is sensing that the engine 1 is idling. When now the accelerator pedal is depressed, the throttle actuating lever 41 turns counter-clockwise in FIG. 5, and the stroke shaft 45 is biased in the direction of the arrow B by the force of the spring 49. As a result, the reduction gear 46 moves away from the idling sensing switch 47, so that the idling sensing switch 47 senses that the engine is not idling. The desired idling rotational speed determined by the position of the stroke shaft 45 is determined by the pulse motor 48. The above operation is carried out under control of the control unit 6. Now, with the rotation of the motor 48, the gear 46 rotates, while the stroke shaft 45 does not rotate.

Figure 6:
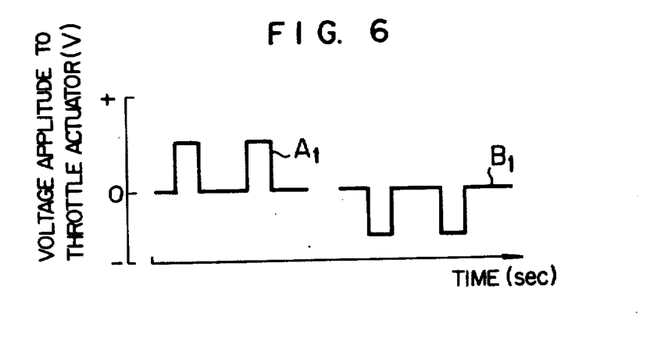
FIG. 6 illustrates pulse waveforms used for energizing the throttle actuator.
Figure 7:
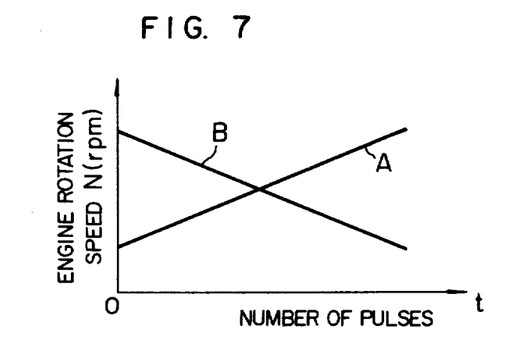
FIG. 7 is a graphical illustration of the operating characteristic of the throttle actuator.

A pulse voltage waveform as shown in FIG. 6 is applied to the pulse motor 48 in the throttle actuator 21 shown in FIG. 5. In FIG. 6, the symbols $A_1$ and $B_1$ designate a normal-rotation pulse signal and a reverse-rotation pulse signal applied to the pulse motor 48, respectively. As shown in FIG. 7, the rotational speed of the engine increases linearly with the increase in the number of pulses and decreases linearly with the decrease in the number of pulses. The linear speed increase in response to the application of the normal-rotation pulse signal is represented by $A_2$ in FIG. 7, and the linear speed decrease in response to the application of the reverse-rotation pulse signal is represented by $B_2$ in FIG. 7.

Figure 8:
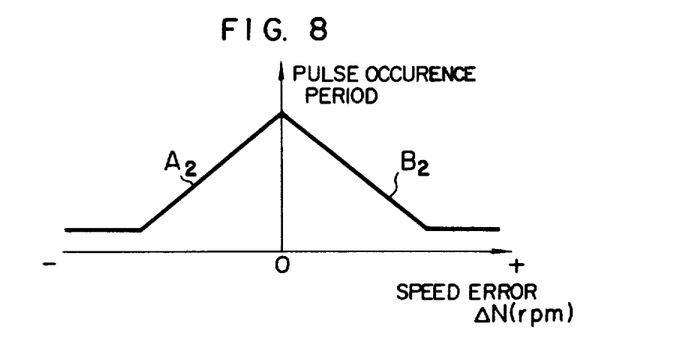
FIG. 8 illustrates the pulse occurrence period relative to the error of the rotation speed.

The moving speed of the stroke shaft 45 in the throttle actuator 21 is varied by varying the pulse occurrence period of the pulse signal of predetermined pulse width. Therefore, when it is desired to move the stroke shaft 45 at a higher speed, the pulse occurrence period is shortened to apply more pulses. FIG. 8 shows the relation between the pulse occurrence period and the error $\Delta N$ of the engine rotation speed N. The symbols $A_2$ and $B_2$ in FIG. 8 designate the relation when the normal-rotation pulse signal and reverse-rotation pulse signal are applied to the pulse motor 48, respectively.

Figure 9:
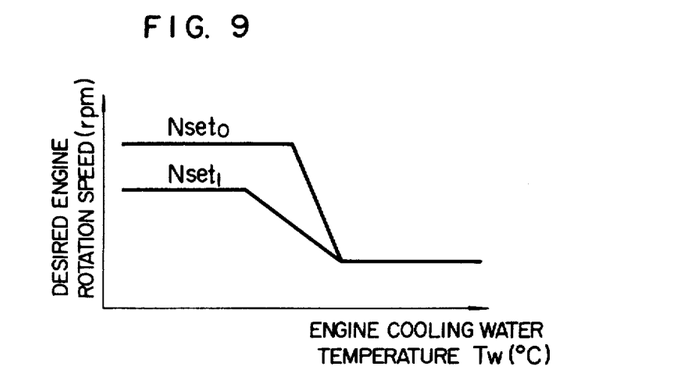
FIG. 9 is a graphical illustration of the two desired idling rotation speeds relative to the temperature of engine cooling water.

Referring to FIG. 9, the characteristic curve $N_{set0}$ represents the desired idling rotation speed when the engine is warmed up without depression of the accelerator pedal even for a short time, and the characteristic curve $N_{set1}$ represents the desired idling rotation speed when the throttle valve 40 is opened once and then closed for revving up during warming-up, or when the vehicle is not driven under the warming-up condition. These data $N_{set0}$ and $N_{set1}$ are stored in the ROM 32.

Figure 10:
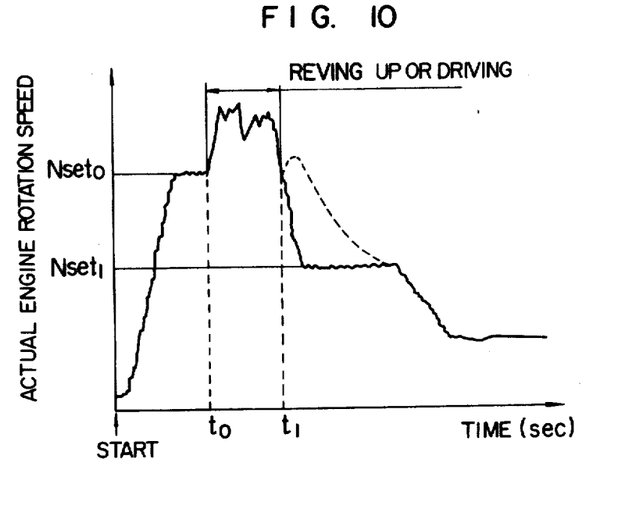
FIG. 10 is a graphical illustration of rotational speed control according to the present invention.

FIG. 10 illustrates how the rotational speed of the engine varies when the throttle valve is opened at time $t_0$ and closed at time $t_1$. For the purpose of control, the data $N_{set0}$ and $N_{set1}$ are read out from the ROM 32 and stored in the RAM 31 at time $t_0$, and the flag indicating that the rotational speed is to be $N_{set0}$ before depression of the accelerator pedal is set. At time $t_1$, the number of pulses corresponding to the value $(N_{set0} - N_{set1})$ is computed, and the reverse-rotation pulse signal $B_2$ including the computed number of pulses of short period which is different from the pulse period characteristic shown in FIG. 8 is applied to the pulse motor 48. However, when the rotational speed becomes lower than $N_{set1}$ before complete application of all the pulses of the reverse-rotation pulse signal $B_2$, the control is immediately interrupted, and the rotational speed is controlled according to the pulse period characteristic shown in FIG. 8. In the case of control according to a prior art method, the rate of decrease of the rotational speed is very slow because the rotational speed is decreased with a pulse period which will not cause hunting of the rotational speed, as shown by the broken curve in FIG. 8.

Figure 11:
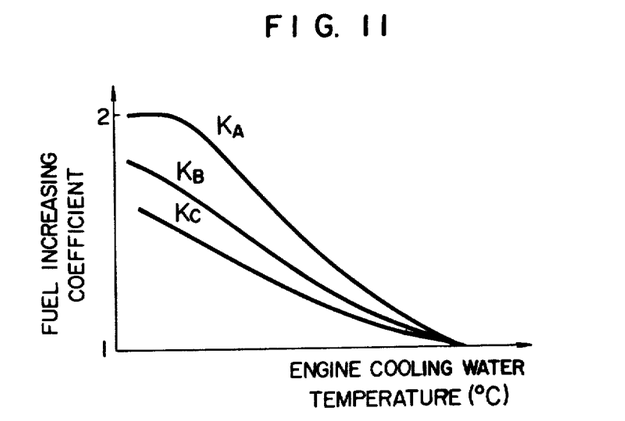
FIG. 11 is a graphical illustration of a plurality of coefficients of fuel quantity increase relative to the temperature of engine cooling water.

A plurality of coefficients of fuel quantity increase relative to the temperature of engine cooling water are stored in the ROM 32 and FIG. 11 shows the characteristic curves of such coefficients $K_A$, $K_B$ and $K_C$, respectively, representing coefficients in a state of acceleration, a state other than acceleration and deceleration, and a state of deceleration. Depending on the operating condition of the engine, the signal indicative of the value obtained by multiplication of the on-duty map data $D_{MAP}$ determined from FIG. 4 by one of these coefficients $K_A$, $K_B$ and $K_C$ is applied to the main fuel control solenoid 7, slow fuel control solenoid 8, starting fuel increasing solenoid 10 and accelerating fuel increasing solenoid 11.

Figure 12:
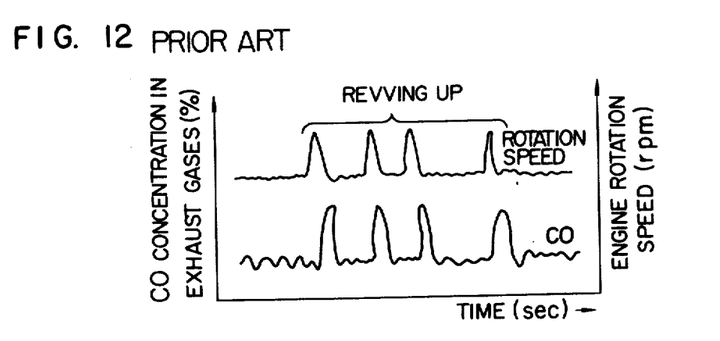
FIGS. 12, 13 and 14 are graphs illustrating the effects of the embodiment of the present invention.
Figure 13:
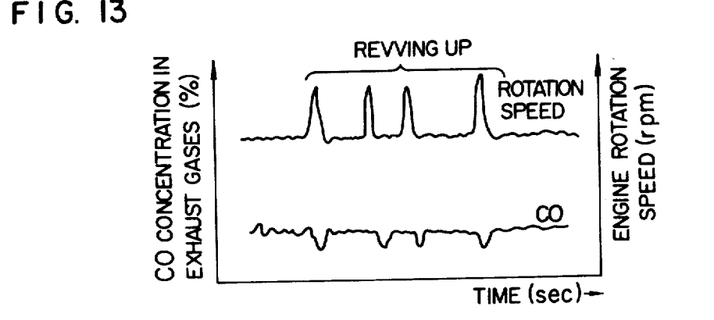
Figure 14:
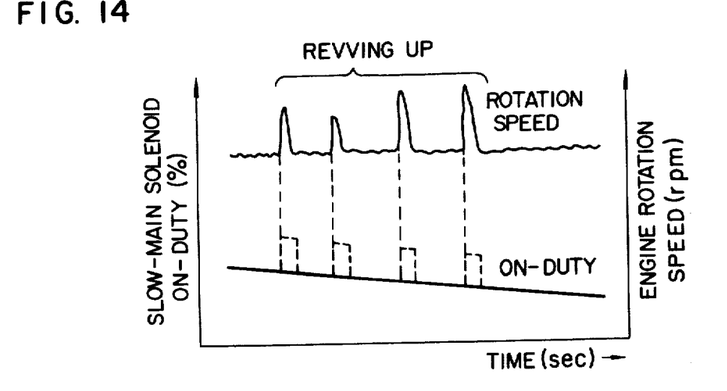

FIG. 14 shows the variation of the on-duty factor of the signal applied to the slow and main fuel control solenoids 8 and 7 when the engine rotating at the idling rotation speed is revved up. According to the prior art method, the fuel quantity is increased to supplement the acceleration as shown by the broken curves in FIG. 14, and the result is that a large quantity of CO is generated whenever the engine is revved up during idling, as shown in FIG. 12. In contrast, according to the present invention, such a large quantity of CO is not generated since the fuel quantity is not increased for supplementing the acceleration even when the accelerator pedal is depressed at the vehicle speed of 0 Km/h, as seen in FIG. 13.

Figure 15:
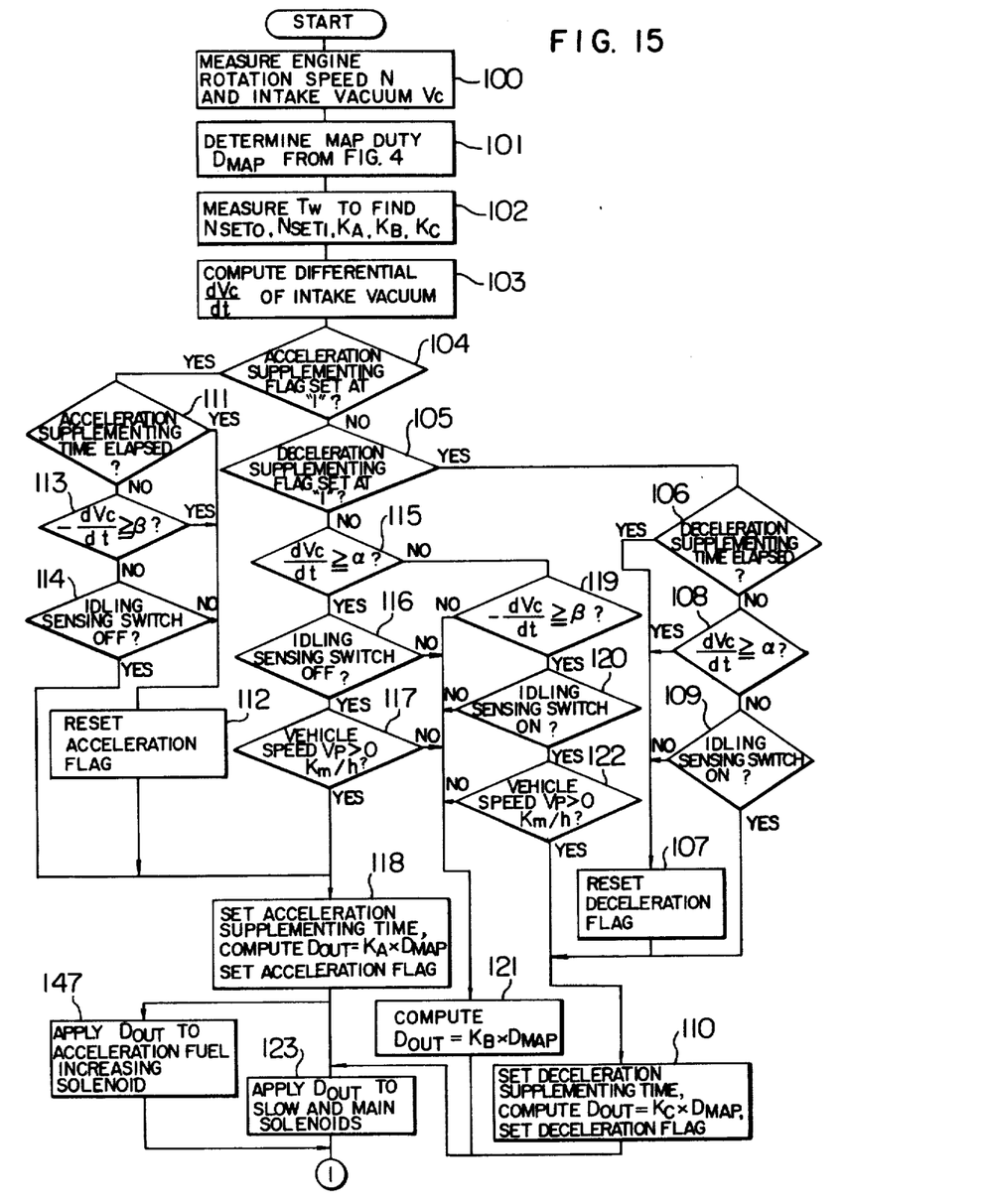
FIGS. 15 and 16 are a flow chart of control according to the embodiment of the present invention.
Figure 16:
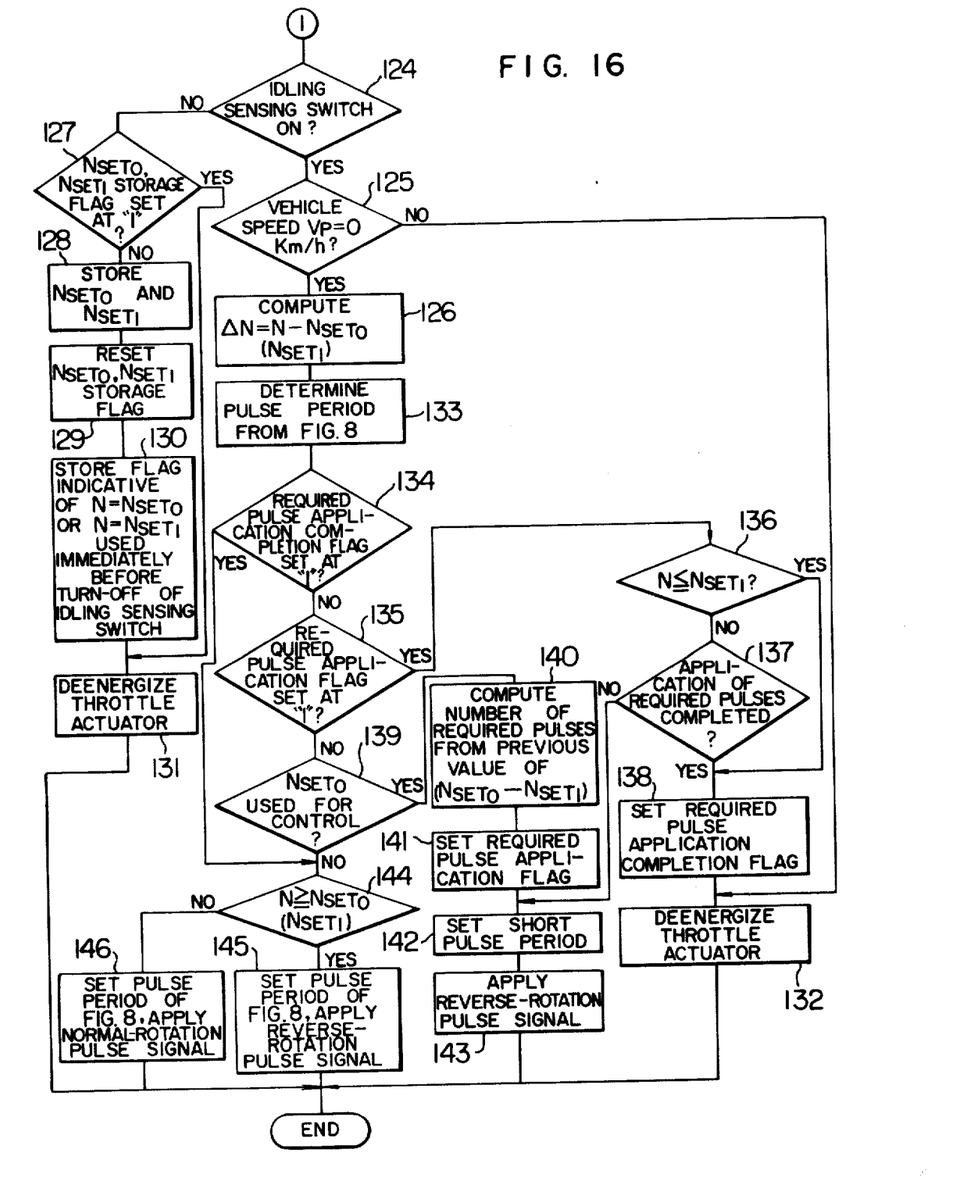

The operation of the embodiment of the present invention will be described in detail with reference to a flow chart shown in FIGS. 15 and 16.

The program is run at predetermined time intervals of, for example, 10 msec.

In step 100, the rotation speed N of the engine 1 and the vacuum $V_C$ in the intake pipe 2 are measured. In step 101, the corresponding map duty $D_{MAP}$ is read out from the map shown in FIG. 4. Then, in step 102, the temperature $T_W$ of engine cooling water is measured to select the idling rotation speeds $N_{set0}$, $N_{set1}$ and the coefficients $K_A$, $K_B$, $K_C$. Then, in step 103, the differential value $dV_c/dt$ of the vacuum $V_c$ in the intake pipe is computed.

In step 104, judgment is made as to whether or not the flag indicative of acceleration supplementing is set at "1". When the result of judgment in step 104 proves that the flag is not set at "1", judgment is made in step 105 as to whether or not the flag indicative of deceleration supplementing is set at "1". When the result of judgment in step 105 proves that the flag is set at "1", judgment is made in step 106 as to whether or not the period of time required for deceleration supplementing has elapsed. When the result of judgment in step 106 proves that the deceleration supplementing period of time has elapsed, the flag indicative of deceleration is reset in step 107. On the other hand, when the result of judgment in step 106 proves that the deceleration supplementing period of time has not elapsed yet, judgment is made in step 108 as to whether or not the relation $dV_c/dt \geq \alpha$ holds, where $\alpha$ shows a predetermined opening rate of the throttle valve. When the result of judgment in step 108 is "yes", step 107 is followed. On the other hand, when the result of judgment in step 108 is "no", step 109 is followed. In step 109, judgment is made as to whether or not the idling sensing switch 47 is in its on position. When the result of judgment in step 109 is "no", step 107 is followed. On the other hand, when the result of judgment in step 109 is "yes", step 110 is followed in which the deceleration supplementing period of time is set, the duty $D_{OUT} = K_c 33 \, D_{MAP}$ is computed, and the flag indicative of deceleration is set.

When the result of judgment in step 104 proves that the flag indicative of acceleration supplementing is set at "1", judgment is made in step 111 as to whether or not the acceleration supplementing period of time has elapsed. When the result of judgment in step 111 is "yes", the flag indicative of acceleration is reset in step 112. On the other hand, when the result of judgment in step 111 is "no", judgment is made in step 113 as to whether or not the relation $=(dV_c/dt) \geq \beta$ holds, where $\beta$ shows a predetermined closing rate of the throttle valve. When the result of judgment in step 113 is "yes", step 112 is followed. On the other hand, when the result of judgment in step 113 is "no", judgment is made in step 114 as to whether or not the idling sensing switch 47 is in its off position. When the result of judgment in step 114 proves that the idling sensing switch 47 is turned off, step 118 is followed in which the acceleration supplementing period of time is set, the duty $D_{OUT} = K_A \times D_{MAP}$ is computed, and the flag indicative of acceleration is set. On the other hand, when the result of judgment in step 114 proves that the idling sensing switch 47 is not turned off, step 112 is followed.

When the result of judgment in step 105 proves that the flag indicative of deceleration supplementing is not set at "1", step 115 is followed in which judgement is made as to whether or not the relation $dV_c/dt \geq \alpha$ holds. When the result of judgment in step 115 is "yes", judgment is made in step 116 as to whether or not the idling switch 47 is in its off position. When the result of judgment in step 116 proves that the idling sensing switch 47 is turned off, judgment is made in step 117 as to whether or not the relation vehicle speed $V_P > 0$ Km/h holds. On the other hand, when the result of judgment in step 116 proves that the idling sensing switch 47 is not turned off, step 121 is followed in which the duty $D_{OUT} = K_B \times D_{MAP}$ is computed.

When the result of judgment in step 117 proves that the relation $V_P > 0$ Km/h holds, step 118 is followed in which the acceleration supplementing period of time is set, the duty $D_{OUT} = K_A \times D_{MAP}$ is computed, and the flag indicative of acceleration is set. On the other hand, when the result of judgment in step 117 proves that the vehicle speed $V_P = 0$ Km/h, step 121 is followed in which the duty $D_{OUT} = K_B \times D_{MAP}$ is computed, and then, in step 123, the signal indicative of $D_{OUT} = K_B \times D_{MAP}$ is applied to the slow fuel control solenoid 8 and main fuel control solenoid 7.

On the other hand, when the result of judgment in step 115 proves that the relation $dV_c/dt \geq \alpha$ does not hold, step 119 is followed in which judgment is made as to whether or not the relation $-(dV_c/dt) \geq \beta$ holds. When the result of judgment in step 119 proves that the above relation holds, judgment is made in step 120 as to whether or not the idling sensing switch 47 is in its on position. On the other hand, when the result of judgment in step 119 proves that the above relation does not hold, step 121 is followed. When the result of judgment in step 120 proves that the idling sensing switch 47 is turned on, judgment is made in step 122 as to whether or not the relation $V_P > 0$ Km/h holds. On the other hand, when the result of judgment in step 120 proves that the idling sensing switch 47 is not turned on, step 121 is followed. On the other hand, when the result of judgment in step 122 proves that the relation $V_P > 0$ Km/h holds, step 110 is followed in which the deceleration supplementing period of time is set, the duty $D_{OUT} = K_C \times D_{MAP}$ is computed, and the flag indicative of deceleration is set. The step 110 is then followed by step 123. In step 123, the aforementioned signal indicative of the duty $D_{OUT} = K_c \times D_{MAP}$ is applied to the slow fuel control solenoid 8 and main fuel control solenoid 7. The signal indicative of the duty $D_{OUT} = K_A \times D_{MAP}$ computed in step 118 is applied in step 123 to the main fuel control solenoid 7 and slow fuel control solenoid 8 for the acceleration supplementing period of time and is also applied in step 147 to the accelerating fuel increasing solenoid 11.

After the application of the $D_{OUT}$-indicative signal to the individual solenoids in steps 123 and 147, judgment is made in step 124 as to whether or not the idling sensing switch 47 is in its on position. When the result of judgment in step 124 proves that the switch 47 is turned on, judgment is made in step 125 as to whether or not the vehicle speed $V_P = 0$ Km/h. When, on the other hand, the result of judgment in step 124 proves that the switch 47 is not turned on, judgment is made in step 127 as to whether or not the flag indicative of storage of $N_{set0}$ and $N_{set1}$ is set at "1". When the result of judgment in step 125 proves that $V_P = 0$ Km/h, the rotation speed error $\Delta N = N - N_{set0}$ (or $N_{set1}$) is computed in step 126, and, in step 133, the pulse period corresponding to the computed value of $\Delta N$ is determined from the graph of FIG. 8 representing the relation between the rotation speed error $\Delta N$ and the pulse occurrence period.

When the result of judgment in step 127 proves that the flag is set at "1", step 131 is followed. On the other hand, when the result of judgment in step 127 proves that the flag is not set at "1", step 128 is followed in which $N_{set0}$ and $N_{set1}$ are stored in the RAM 31. Then, in step 129, the flag indicative of storage of $N_{set0}$ and $N_{set1}$ is set at "1". Then, in step 130, the flag indicative of whether N is represented by $N_{set0}$ or $N_{set1}$ immediately before turning-off of the idling sensing switch 47 is set. Then, in step 131, the throttle actuator 21 is deenergized to complete the program.

After the determination of the pulse period in step 133, judgment is made in step 134 as to whether or not the required pulse application completion flag indicative of the control by the computed number of the reverse-rotation pulses corresponding to the value of $(N_{set0} - N_{set1})$ selected up to that time is set at "1". When the result of judgment in step 134 proves that the flag is set at "1", step 144 is followed. On the other hand, when the result of judgment in step 134 proves that the flag is not set at "1", judgment is made in step 135 as to whether or not the flag indicative of application of the required pulses is set at "1". When the result of judgment in step 135 proves that the flag is set at "1", judgment is made in step 136 as to whether or not the engine rotation speed N is lower than or equal to $N_{set1}$. When the result of judgment in step 136 proves that the relation $N \leq N_{set1}$ holds, step 138 is followed. On the other hand, when the result of judgment in step 136 proves that the relation $N \leq N_{set1}$ does not hold, judgment is made in step 137 as to whether or not application of the required pulses has been completed. When the result of judgment in step 137 proves that application of the pulses has been completed, the flag indicative of complete application of the required pulses is set at "1" in step 138, and the throttle actuator 21 is deenergized in step 131. On the other hand, when the result of judgment in step 137 proves that application of the required pulses has not still been completed, step 142 is followed.

On the other hand, when the result of judgment in step 135 proves that the flag indicative of application of the required pulses is not set at "1", judgment is made in step 139 as to whether or not $N_{set0}$ has been selected up to then for the control. When the result of judgment in step 139 is "yes", the number of required pulses is computed on the basis of the previous value of $(N_{set0} - N_{set1})$ in step 140, and the flag indicative of application of the required pulses is set at "1" in step 141. After the setting of the flag in step 141, a short pulse period different from the pulse period characteristic shown in FIG. 8 is set in step 142, and the reverse-rotation pulse signal is applied to the pulse motor 48 in step 143.

On the other hand, when the result of judgment in step 139 is "no", judgment is made in step 144 as to whether or not the relation $N \geq N_{set0}$ (or $N_{set1}$) holds. When the result of judgment in step 144 proves that the above relation holds, the pulse period $B_2$ in the pulse period characteristic shown in FIG. 8 is set in step 145 to apply the reverse-rotation pulse signal $B_1$ to the pulse motor 48. On the other hand, when the result of judgment in step 144 proves that the relation $N \geq N_{set0}(N_{set1})$ does not hold, the pulse period $A_2$ in the pulse period characteristic shown in FIG. 8 is set in step 146 to apply the normal-rotation pulse signal $A_1$ to the pulse motor 48.

Therefore, when the throttle valve 40 is not opened even for a short time until the stage of engine warming-up is completed, the rotation speed error $\Delta N = N - N_{set0}$ is computed in step 126, and whether or not the relation $N \geq N_{set0}$ holds is judged in step 144. Then, in step 145 or 146, the pulse period $B_2$ or $A_2$ corresponding to the value of $\Delta N$ is set. On the other hand, when the throttle valve 40 is opened once and then closed during the warming-up, the procedure including the steps 139 to 143 is carried out immediately after the closure of the throttle valve, and a short pulse period different from the characteristic shown in FIG. 8 is set to apply the reverse-rotation pulse signal $B_1$ of short period to the pulse motor 48.

Further, when the throttle valve 40 is opened once during warming-up, the rotation speed error $\Delta N = N - N_{set1}$ is computed in step 126, and whether or not the relation $N \geq N_{set1}$ holds is judged in step 144. Then, the pulse period $B_2$ or $A_2$ corresponding to the value of $\Delta N$ is set in step 145 or 146.

We claim:

1. An apparatus for controlling an internal combustion engine comprising:
    an intake air passage for supplying air into a combustion chamber of the engine;
    a throttle valve disposed in said intake air passage;
    electronically controlled fuel supplying means for controlling a quantity of fuel supplied into the combustion chamber of said engine on the basis of operating parameters of said engine;
    supplementing air control means for controlling a quantity of air flowing through said intake air passage for the purpose of controlling a rotational speed of said engine in the stage of warming up;
    first desired warming-up rotational speed characteristic generating means for generating a signal for rotating said engine at a first desired warming-up rotational speed having such a characteristic that the desired warming-up rotational speed decreases with an increase in the engine temperature;
    second desired warming up rotational speed characteristic generating means for generating a signal for rotating said engine at a second desired warming-up rotational speed which is lower than said first desired warming-up rotational speed and has such a characteristic that the desired warming-up rotational speed decreases with an increase in the engine temperature; and
    control signal generating means including selecting means for selecting the signal from said first desired warming-up rotational speed characteristic generating means when said throttle valve is not opened during warming-up of said engine but selecting the signal from said second desired warming-up rotational speed characteristic generating means when said throttle valve is closed after it has been opened during warming-up of said engine, said control signal generating means comparing said selected signal indicative of one of said desired warming-up rotational speeds with the signal indicative of the actual rotational speed of said engine and applying a control signal to said supplementing air control signal to said supplementing air control means so that the actual rotational speed of said engine coincides with said selected desired warming-up rotational speed.

2. An apparatus as claimed in claim 1, wherein said control signal generating means generates a control signal including a component which corresponds to a variation between the signal indicative of said selected desired warming-up rotational speed and the signal indicative of the actual rotational speed of said engine and which slows down the response of said supplementing air control means with an increase in said variation.

3. An apparatus as claimed in claim 2, wherein, when the signal from said first desired warming-up rotational speed characteristic generating means is changed over to the signal from said second desired warming-up rotational speed characteristic generating means as a result of opening of said throttle valve, said control signal generating means generates a change-over purpose control signal having a component providing a quick response compared with the control signal corresponding to the error between the signal indicative of said first desired warming-up rotational speed and the signal indicative of the actual rotational speed of said engine.

4. An apparatus as claimed in claim 3, wherein said change-over purpose control signal includes a response component corresponding to the variation between the signal indicative of said first desired warming-up rotational speed and the signal indicative of said second desired warming-up rotational speed.

5. An apparatus as claimed in claim 1, wherein said supplementing air control means is an electrical actuator which changes an opening of said throttle valve.

6. An apparatus as claimed in claim 5, wherein said electrical actuator includes a pulse motor.

7. An apparatus as claimed in claim 1, wherein an idling sensing switch is provided as means for sensing that said throttle valve is opened.

8. An apparatus as claimed in claim 1, wherein said control signal generating means includes a microcomputer.

9. An apparatus as claimed in claim 8, wherein said first and second desired warming-up rotational speed characteristic generating means are an ROM constituting a part of said microcomputer.

10. An apparatus as claimed in claim 1, wherein said electronically controlled fuel supplying means includes means for increasing the quantity of fuel for acceleration when said throttle valve is opened and driving sensing means for sensing driving of the vehicle, but not increasing the fuel quantity for acceleration when said driving sensing means does not sense the driving of the vehicle although said throttle valve is opened.

11. An apparatus as claimed in claim 10, wherein said driving sensing means is a pressure sensor sensing an internal pressure of said intake air passage.

12. An apparatus as claimed in claim 1, further comprising sensor means for determining engine temperature from measuring a temperature of water used as an engine coolant.

* * * * *